US005629523A

United States Patent [19]

Ngo et al.

[11] Patent Number: 5,629,523

[45] Date of Patent: May 13, 1997

[54] APPARATUS FOR THE MICROCOLLIMATION OF PARTICLES, DETECTOR AND PARTICLE DETECTION PROCESS, PROCESS FOR THE MANUFACTURE AND USE OF SAID MICROCOLLIMATING APPARATUS

[75] Inventors: Christian Ngo, Saint Remy les Chevreuse; Thierry Pochet, Bonnelles, both of France

[73] Assignee: Commissariat A L'Energie Atomique, Paris, France

[21] Appl. No.: 605,848

[22] Filed: Feb. 26, 1996

[30] Foreign Application Priority Data

Mar. 14, 1995 [FR] France .................................. 95 02911

[51] Int. Cl.[6] .................................................. G01T 1/16

[52] U.S. Cl. .................................. 250/370.05; 250/505.1

[58] Field of Search ........................ 250/370.05, 370.06, 250/370.03, 390.01, 505.1, 363.1

*Primary Examiner*—David P. Porta

*Assistant Examiner*—Richard Hanig

*Attorney, Agent, or Firm*—Burns, Doane, Swecker & Mathis, LLP

[57] ABSTRACT

The present invention relates to an apparatus for the microcollimation of incident particles constituted by an array of microholes with a size of approximately 1 micrometer, which are drilled in a random manner, but oriented in parallel, in an insulating sheet having a thickness between a few micrometers and several millimeters. The present invention also relates to a detector and a process for the detection of particles, as well as to a process for the manufacture and use of said microcollimating apparatus.

22 Claims, 3 Drawing Sheets

APPARATUS FOR THE MICROCOLLIMATION OF PARTICLES, DETECTOR AND PARTICLE DETECTION PROCESS, PROCESS FOR THE MANUFACTURE AND USE OF SAID MICROCOLLIMATING APPARATUS

TECHNICAL FIELD

The present invention relates to an apparatus for the microcollimation of particles, a detector and a particle detection process, as well as a process for the manufacture and use of said collimating apparatus.

PRIOR ART

Neutrons are neutral particles. They cannot be directly detected with conventional detectors, because the latter function by the collection of charges created during the passage of the particle to be detected. The detection of neutrons requires a converter indicating the presence of a neutron by the formation of one or more charged particles. In detectors operating on the charge collection principle, charged particles permit the detection of the presence of a neutron.

The present invention relates to the pulsewise detection of thermal neutrons with the aid of semiconductor or gas-based detectors. The detection of thermal neutrons is a significant problem, particularly for monitoring the operation of nuclear reactors. This pulsewise detection leads to problems associated with energy losses in the converter and the angle of arrival of the charged particles in the detector.

The conversion of a thermal neutron into charged particles can take place by several nuclear reactions having a large cross-section. Reference will be made hereinafter to the most widely used reactions, but the invention relates to any nuclear reaction creating charged particles, e.g. from a thermal neutron or the like:

$^{10}B+n \rightarrow {}^{4}He+{}^{7}Li$ +2310 keV

The cross-section of this reaction for thermal neutrons is 3900 barns:

$^{3}He+n \rightarrow {}^{1}H+{}^{3}H$ +764 keV

The cross-section of this reaction for thermal neutrons is high, namely 5400 barns. As helium is a gas, the converter must be confined between two thin sheets supported by wires when the pressure is high. The helium must be enriched with $^{3}He$, because the proportion of this isotope in the natural isotopic composition is only 0.1%:

$^{235}U+n \rightarrow F_1+F_2+xn$ +194 MeV

The cross-section with respect to thermal neutrons is lower (580 barns), but the energy released is very high and the fragments are heavy. This means that they can easily be stopped in 10 to 20 μm of plastic. It is pointed out that natural uranium only contains 0.7% $^{235}U$.

In the remainder of the description, consideration will be given to the first reaction ($^{10}B+n \rightarrow {}^{4}He+{}^{7}Li$) for the purpose of illustrating the invention, but the latter applies to all other reactions not specifically indicated here.

The apparatus diagrammatically shown in FIG. 1 is a semiconductor detector 10, e.g. of crystalline silicon or amorphous silicon, on which has been deposited a thin $^{10}B$ boron coating (converter 11). The large cross-section of capture of thermal neutrons by $^{10}B$ boron makes it possible to convert a neutron flux into two charged fragments: a $^{4}He$ of 1.47 MeV and $^{7}Li$ of 0.84 MeV emitted at 180° from one another (fragments F1 and F2 in the drawing). The path of $^{4}He$ (helium) and $^{7}Li$ (lithium) in $^{10}B$ does not exceed 3.6 μm. Consequently it serves no useful purpose to increase the thickness of the film beyond 3.6 μm, because the fragments can no longer reach the detector and remain in the boron deposit.

The capture of a thermal neutron is a random process governed by a large cross-section. The two fragments F1 and F2 are emitted at 180° from one another, which means that only one of them is emitted in the half-space containing the semiconductor detector. Consequently, at best, the detector can only detect one of the two emitted fragments. The angular distribution of emission of the two fragments is isotropic in the reference frame of the mass center of the system constituted by $^{10}B$ and the neutron. In view of the low kinetic energy of the thermal neutron (1/40 eV), said reference frame coincides with that of the laboratory and this is the reason why the two fragments are emitted at 180° from one another. The emission angle of the fragment reaching the detector can be of a random nature (0° to 180°, where 90° corresponds to a normal incidence on the detector). The emission position of the fragment in the converter can also be of a random nature and this is diagrammatically shown in FIG. 2.

In the case of a pulse operation, a thermal neutron gives, in the semiconductor detector, a signal with an amplitude varying from a very low value (emission of the fragment close to 0° or 180°) to a maximum value corresponding to an emission at 90° close to the entrance face of the detector. This variation of the pulse amplitude is continuous and it is difficult for low values to separate the signals due to the neutrons from those due to the background noise of the detector. This can be significant if the said detector is formed from a film, such as e.g. amorphous silicon.

In order to quantitatively illustrate what has been said with respect to the emission angle of the fragment emitted in the half-space (the energy loss problems are ignored for this), FIG. 3 shows the proportion of fragments emitted with an angle θ with respect to the vertical to the detector (θ=0 corresponding to an emission perpendicular to the entrance face of the detector, whereas θ=90° corresponds to an emission parallel thereto). It can be seen that few fragments emitted in the converter give an adequate signal in the detector. However, the resulting energy spectrum varies from 0 to a maximum value defined hereinbefore. If account is taken of the energy loss in the converter, said effect is amplified and the spectrum observed has the form illustrated in FIG. 4. Thus, any quantitative measurement is greatly disturbed by the aforementioned effects. In particular for the low energy part, it is difficult to separate the contribution to the spectrum from low energy fragments from that caused by the background noise of the detector or electronics. When current operation is used, i.e. for high neutron fluxes, on average account can be taken of this effect following a careful calibration of the detector. In this case, it is possible to measure a mean neutron flux. For a pulse operation this is not possible. Thus, as shown in FIG. 4, the counting rate (dn/dE) increases greatly and continuously when the kinetic energy of the detected product increases. An electronic threshold then leads to a high error, because it is dependent on outside conditions, a low variation of the threshold leading to a high variation of the counting rate. It is also difficult to envisage a separation of the signals by an advanced signal processing method, because they are all of the same type.

The present invention aims at obviating these disadvantages.

DESCRIPTION OF THE INVENTION

The invention relates to an apparatus for microcollimating incident particles, constituted by an array of microholes, with a size of approximately 1 micrometer, which are randomly drilled, but oriented in parallel, in an insulating sheet with a thickness between a few micrometers and several millimeters.

Advantageously the insulating sheet is of plastic, e.g. polycarbonate, kapton or polyimide. It can also be of cleaved mica. More generally it can be of a material in which it is possible to produce latent traces or tracks by the bombardment of large ions. The density of the holes is below $10^8/cm^2$.

The invention also relates to a particle detector comprising a particle converter permitting the production of charged particles, an array of microcollimators each with a size of approximately 1 micrometer drilled in random manner, but oriented, in an insulating sheet with a thickness between a few micrometers and several millimeters and a charged particle detector.

The cross-section of capture or conversion in the converter advantageously exceeds that of the sheet. In the illustrated embodiment, the converter comprises a boron layer. The charged particle detector is a crystalline, polycrystalline or amorphous semiconductor or a gas detector. The particles can be thermal neutrons, neutrons or photons.

The invention also relates to a process for the detection of particles consisting of placing the apparatus in a particle detector, between a layer for converting the particle into electrically charged fragments and a charged particle detector. The particles to be detected can be thermal neutrons, neutrons or photons. The invention can also be used for other neutral particles, e.g. aggregates or atoms. This process, in a pulsewise counting procedure, is constituted by the implementation of the aforementioned microcollimating apparatus, without treatment of the signals collected in the charged particle detector.

The invention is also intended to be used for detecting other particles if they are emitted in a large solid angle in space. For this purpose it is necessary for the kinetic energy to be such that they can be stopped by the microcollimating array if they do not pass through one of the holes. In this sense, the apparatus of the invention acts as a direction filter, only permitting the passage of particles arriving virtually perpendicularly on the surface of the apparatus. This filtering is also accompanied by a significant reduction in the counting rate, because only a small proportion of the particles are "filtered". In this sense, the apparatus can also serve as a counting rate attenuator.

The invention also relates to a process for the production of a microcollimating apparatus comprising a stage of bombarding a plastic sheet with a large ion beam. Advantageously the large ions are projectiles having at least the mass of krypton. The particle flux is approximately $5\times10^7$ particles/cm$^2$. In a variant, this production process comprises a lithographic production stage.

Advantageously mass production takes place (by bombardment of large ions or lithograph) of a microcollimator array making it possible to collimate particles no matter whether or not they are charged (ions, atoms, etc.).

DETAILED DESCRIPTION OF EMBODIMENTS

Figure 1:
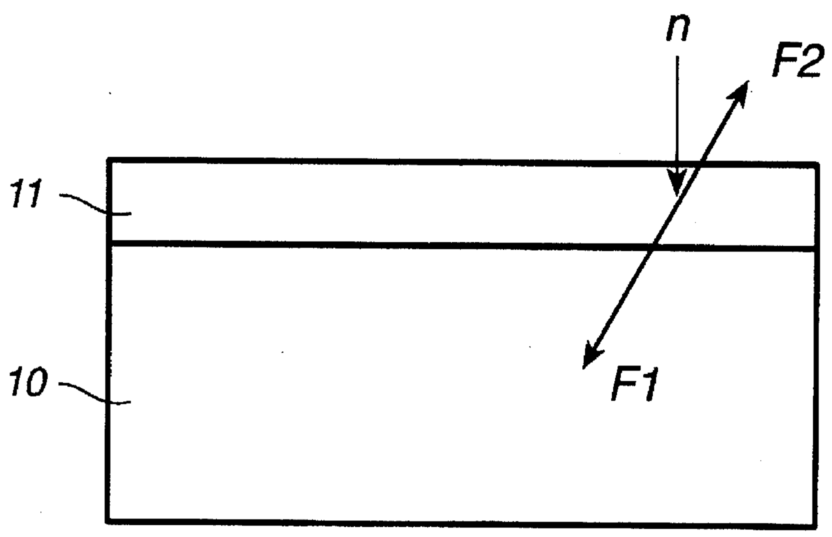
FIG. 1 (PRIOR ART)
FIG. 1 illustrates a prior art semiconductor detector.
Figure 2:
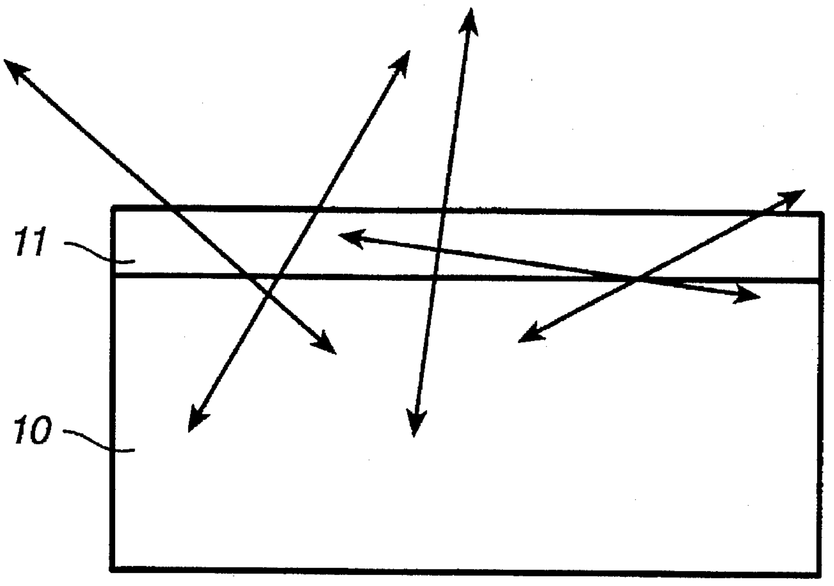
FIG. 2 (PRIOR ART)
FIG. 2 illustrates the emission position of a fragment in the converter of FIG. 1.
Figure 3:
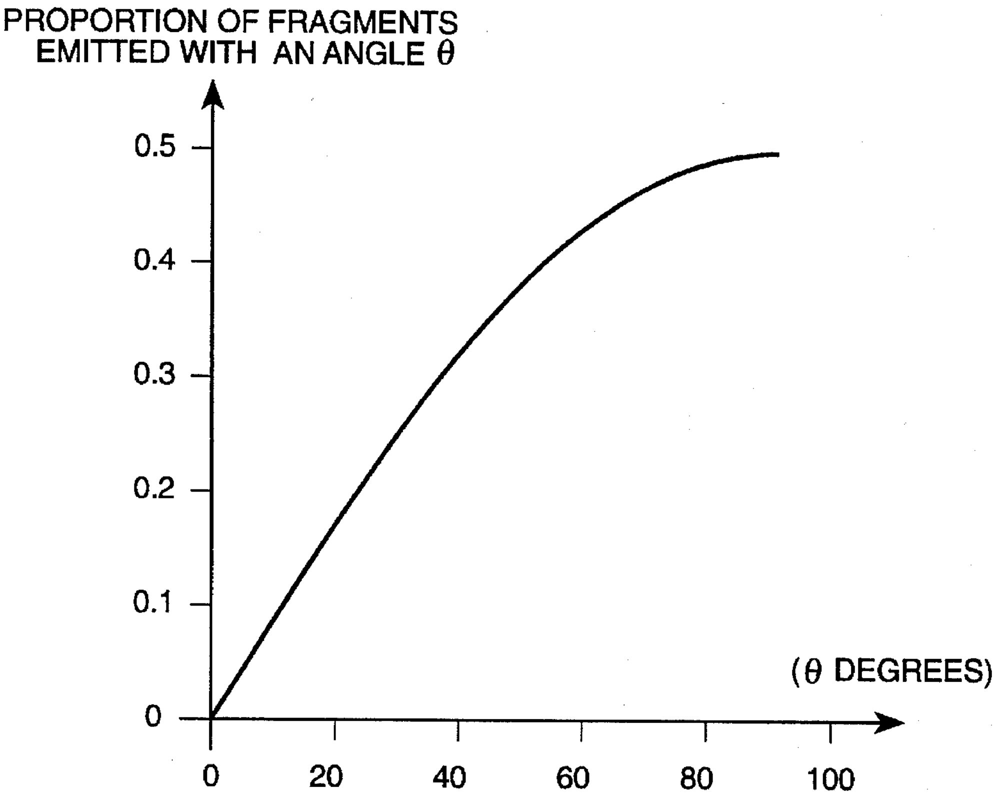
FIG. 3 illustrates the proportion of fragments emitted with an angle θ with respect to the vertical to the detector of FIG. 1.
Figure 4:
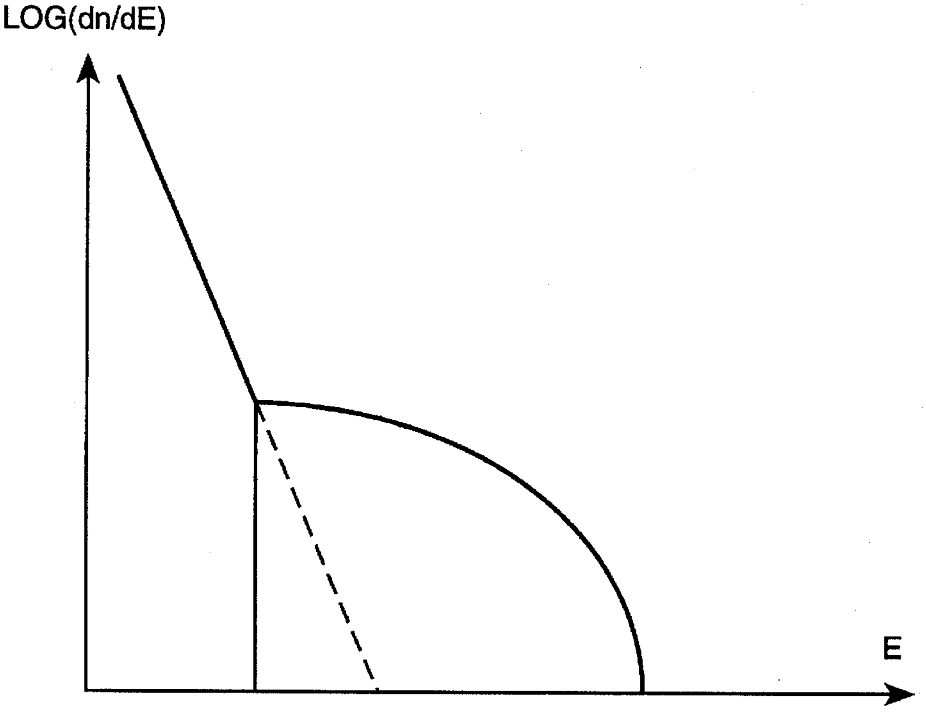
FIG. 4 diagrammatically illustrates the spectrum observed with the detector shown in FIG. 1.
Figure 5:
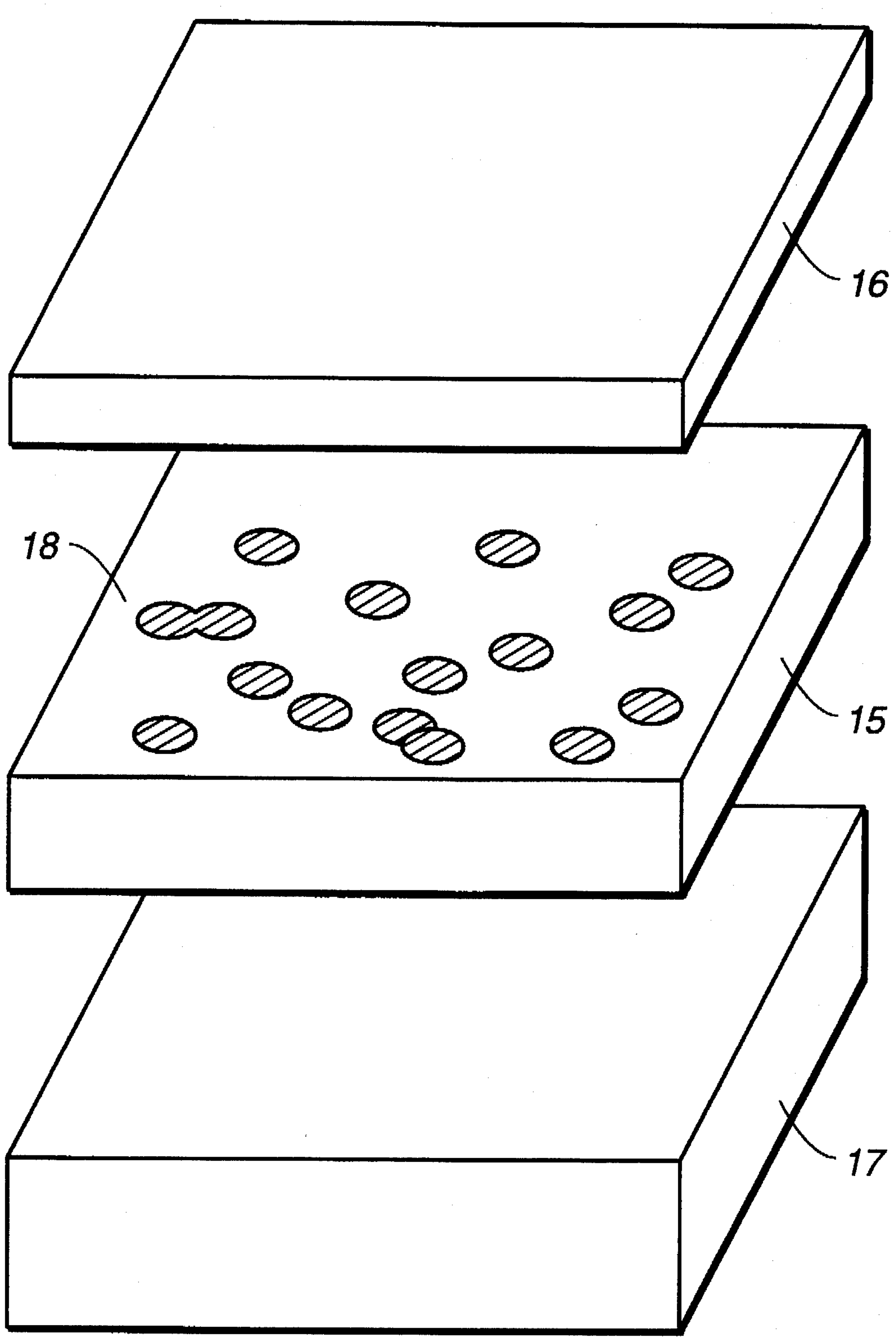
FIG. 5 illustrates an exploded view of a detector according to the invention.

The invention proposes the use of holes, which are randomly drilled, but oriented in the same direction, in an insulating sheet 15, e.g. of cleaved mica or plastic, in order to collimate the fragments from the neutron converter 16. To do this, the sheet is placed between the converter deposit 16 and the entrance face of the detector 17, as shown in FIG. 5 for an exploded view. The holes 18 made in this sheet are approximately 1 micrometer (μm). The sheet has a thickness variable between a few micrometers and several millimeters as a function of the nature and energy of the fragment emitted by the converter. Thus, the process proposed for thermal neutrons can also have applications for any particle converter, provided that the capture or conversion cross-section in the converter is well above that of the plastic sheet. The plastic sheet containing holes of about 1 micron has two functions. The microholes make it possible to collimate incident particles. Only the particles emitted virtually perpendicularly to the detector pass through the holes. To a certain extent the depth of the hole makes it possible to vary said angular aperture. The second function of the perforated sheet is to absorb the particles not passing precisely into the microholes. This makes it possible to eliminate the fragments emitted with an angle of incidence exceeding that defined by the microholes. The result of interposing the sheet is to extract from the continuous energy spectrum of FIG. 5 the high energy part and therefore precisely measure and identify the thermal neutron flux.

Therefore this collimating apparatus serves as a direction selector for the incident charged particles. The number of particles passing through the microholes is a small proportion of the incident particles. Thus, the apparatus also has a counting rate attenuating function.

The use of a collimator or collimators for selecting the direction of an incident particle is obviously not novel. A collimator is normally produced by drilling or machining. This process is perfect for manufacturing collimators having macroscopic dimensions. However, this cannot be extrapolated to dimensions of approximately 1 micron. The invention proposes the production of such collimators by a process not normally used in the detection field. It is consequently a question of producing them by a large ion beam having an appropriate kinetic energy. Each large ion serves as a drill and creates a fault in the material, which can be transformed into a hole with micronic dimensions by chemical developing.

In order to produce microholes arranged in a random manner in a sheet of plastic (polycarbonate, kapton, polyimide, etc.), the simplest process is to irradiate it with a large ion beam from an accelerator or a source of fission fragments such as $^{252}$Cf. The slowing down of a large ion in the material starts with an electronic slowing down which generates charges, followed by a nuclear slowing down when the kinetic energy of the incident ion is below approximately 0.1 MeV per nucleon. During the slowing down in an insulating material and optionally a semiconductor material, the ion produces a latent trace or track, whose diameter is approximately 10 nanometers. This latent trace is surrounded by a halo resulting from the ejection of electrons detached during the slowing down of the large ion (delta electron). The diameter of the halo is approximately 1 micrometer. By chemically developing the latent trace, holes are obtained with a diameter of approximately 1 micrometer.

Compared with conventional lithography methods, the interest of large ions is that each of them produces a latent trace, which is well geometrically defined and permits, after developing, the obtaining of holes of approximately 1 micrometer. The larger the ion, the straighter and better defined the trajectory of the ion in the material. In practice, it is necessary to create holes with projectiles having at least the mass of krypton. The use of large ions in etching is very different from that of photons or electrons. Thus, for the latter, the formation of a latent trace requires the participation of several electrons or particles. Therefore a mask is necessary in the case of photons (visible, ultraviolet, X or Y rays). For electrons, it is possible to envisage controlling them because they are charged. For limited thicknesses, conventional lithography makes it possible to produce holes arranged in order. However, as soon as significant thicknesses are desired and where the distribution of the holes may be of a random nature, large ions are more suitable.

The number of holes which can be produced in the sheet depends on the incident flux. Typically, a density of $10^8$ holes/cm$^2$ represents a maximum not to be exceeded. This is below the capacities of a particle accelerator. With such a density of holes, the porosity, defined as the number of holes multiplied by the surface of one of them is 0.785. This high value means that the probability of having overlapping holes is not zero. However, this is a minor disadvantage, even if several holes overlap, they still define an angle for the fragments close to the vertical. A lower flux, such as $5\times10^7$ particles/cm$^2$, greatly reduces this overlap probability, whilst retaining a porosity of 0.4.

The depth of the hole is dependent on the energy and the size of the incident ion. For kinetic energy levels of approximately 1 MeV per nucleon, the depth is approximately 10 micrometers. The interest of using large ions is the possibility of having a high energy dynamics thus making it possible to control the depth of the hole, whilst still maintaining costs at a reasonable level.

Consideration will now be given to the angular aperture of these microcollimators and their efficiency in detection terms. It is possible to consider a diameter 1 micrometer hole and a depth of 10 micrometers. The angular aperture is 5.7°, which represents a solid angle of 0.03 sr, i.e. 0.25% of the total space. This small aperture will greatly reduce the counting rate compared with the case where the converter is not separated from the detector by microcollimators. However, the particles detected are now perfectly identified and separated from the background noise. This small angular aperture also has the advantage of making it possible to measure, in the pulse mode, much higher fluxes than when microcollimators are absent. This can have an advantage for the measurement of neutron fluxes under intermediate conditions ($10^{-6}$–$10^9$ neutrons/cm$^2$/s). In this case, the collimating apparatus also has an attenuating function.

We claim:

1. Apparatus for microcollimating incident particles, constituted by an array of microholes with a size of approximately 1 micrometer, drilled in a random manner, but oriented in parallel, in an insulating sheet with a thickness between a few micrometers and several millimeters.

2. Microcollimating apparatus according to claim 1, wherein the insulating sheet is of a material in which can be formed latent traces by bombardment of large ions.

3. Apparatus according to claim 2, wherein the insulating sheet is of plastic.

4. Apparatus according to claim 3, wherein the sheet is of polycarbonate, kapton or polyimide.

5. Apparatus according to claim 1, wherein the insulating sheet is of cleaved mica.

6. Apparatus according to claim 1, wherein the density of the holes is below $10^8$/cm$^2$.

7. Particle detector incorporating a particle converter permitting the production of charged particles, an array of microcollimators, each having a size of about 1 micrometer, drilled in random manner, but oriented in parallel, in an insulating sheet with a thickness between a few micrometers and several millimeters and a charged particle detector.

8. Detector according to claim 7, wherein the capture or conversion cross-section in the converter is well above that of the insulating sheet.

9. Detector according to claim 7, wherein the converter comprises a boron layer.

10. Detector according to claim 7, wherein the charged particle detector is a crystalline, polycrystalline or amorphous semiconductor or a gas detector.

11. Detector according to claim 7, wherein the particles are thermal neutrons, neutrons or photons.

12. A process for the detection of particles comprising: providing a microcollimating apparatus comprising an array of microholes with a size of approximately 1 micrometer, drilled in a random manner, but oriented in parallel, in an insulating sheet with a thickness between a few micrometers and several millimeters, and placing the microcollimating apparatus between a layer for converting the particle into electrically charged fragments and a charged particle detector.

13. Process according to claim 12, wherein the particles are thermal neutrons, neutrons or photons.

14. Process according to claim 12, in a pulsewise counting mode, constituted by the use of the microcollimating apparatus, with no treatment of the signals collected in the charged particle detector.

15. Process for the production of an apparatus for the microcollimation of incident particles according to claim 1 comprising a stage of bombarding a plastic sheet with a beam of large ions.

16. Process according to claim 15, wherein the large ions are projectiles having at least the mass of krypton.

17. Process according to claim 15, wherein the particle flux is approximately $5\times10^7$ particles/cm$^2$.

18. Process for the production of an apparatus for the microcollimation of incident particles according to claim 1 comprising a lithographic production stage.

19. Process according to claim 15, wherein mass production takes place by the bombardment of large ions or by lithography of an array of microcollimators making it possible to collimate particles, no matter whether or not they are charged.

20. Process according to claim 18, wherein mass production takes place by the bombardment of large ions or lithography of an array of microcollimators making it possible to collimate particles no matter whether or not they are charged.

21. Use of an array of microcollimators for separating particles having different incidences, wherein the microcollimators are each constituted by an array of microholes with a size of approximately 1 micrometer, drilled in a random manner, but oriented in parallel, in an insulating sheet with a thickness between a few micrometers and several millimeters.

22. Use of an array of microcollimators for attenuating an incident beam wherein the microcollimators are each constituted by an array of microholes with a size of approximately 1 micrometer, drilled in a random manner, but oriented in parallel, in an insulating sheet with a thickness between a few micrometers and several millimeters.

* * * * *